United States Patent [19]

Skybyk

[11] Patent Number: 5,216,339
[45] Date of Patent: Jun. 1, 1993

[54] LATERAL ELECTRIC MOTOR

[76] Inventor: Dmytro Skybyk, 340 Evans St., Williamsville, N.Y. 14221

[21] Appl. No.: 769,355

[22] Filed: Sep. 30, 1991

[51] Int. Cl.$^5$ .............................................. H02P 6/00
[52] U.S. Cl. .................... 318/254; 318/138; 310/68 R; 310/42; 310/112; 310/114
[58] Field of Search ................. 318/138, 254, 439; 310/42, 68 R, 112, 114, 121, 126, 127, 156, 179, 198, 206, 207, 216, 217, 218, 254, 259, 261, 264, 268

[56] References Cited

U.S. PATENT DOCUMENTS

| | | | |
|---|---|---|---|
| 2,719,931 | 10/1955 | Kober | 310/156 |
| 3,979,619 | 9/1976 | Whiteley | 310/168 |
| 4,006,375 | 2/1977 | Lyman, Jr. et al. | 310/49 R |
| 4,043,614 | 8/1977 | Lyman | |
| 4,187,441 | 2/1980 | Oney | 310/112 |
| 4,188,556 | 2/1980 | Hahn | 310/268 |
| 4,234,838 | 11/1980 | Langley et al. | 318/696 |
| 4,491,769 | 1/1985 | Heidelberg | 318/254 |
| 4,568,862 | 2/1986 | Tassinario | 318/254 |
| 4,629,920 | 12/1986 | Hermann | 310/156 |
| 4,633,149 | 12/1986 | Welterlin | 318/254 |
| 4,882,524 | 11/1989 | Lee | 318/254 |

Primary Examiner—Bentsu Ro
Attorney, Agent, or Firm—Richard C. Litman

[57] ABSTRACT

The present invention is a lateral electric motor which can be driven in a single stage drive mode, a two stage drive mode or any other multiple drive stage mode. The main components of the lateral electric motor include permanent magnet poles mounted within a disk rotor which is positioned axially along a shaft and in between a first stator housing assembly and a second stator housing assembly. The first and second stator housing assemblies include wound armature coils mounted to lamination blocks and positioned to face opposite the permanent magnet poles. Each stator is configured with a first segment comprising a plurality of armature coils connected in series wherein the first segment is connected in parallel to a second segment through a switching device to a power supply. With this type of configuration the first and second stator housing assemblies can be further configured to either individually drive the lateral electric motor or be connected to drive the electric motor simultaneously.

13 Claims, 11 Drawing Sheets

LATERAL ELECTRIC MOTOR

FIELD OF THE INVENTION

This invention relates to a high torque brushless electric motor. In particular, it relates to a lateral brushless electric DC motor with inverted stator-rotor configuration as oppose to that of conventional cylindrical electric motors.

BACKGROUND OF INVENTION

Brushless electric DC motors were known in the industry. Typically these motors are configured with two members, a stator and a rotor, each disposed opposite one another either in the axial direction, i.e., side by side along a common axis, or else in a radial direction, i.e., one member being positioned within the other. Some of these latter configurations are complex, large, and expensive to manufacture. In general, one member is typically a stator with a plurality of electromagnetic or permanent magnet field poles upon it, while the other member is a rotor having a plurality of armature coils with carbon brushes or solid state commutations on it opposite the stator windings. Generally an air gap separates the two members.

While the art has been concerned with increasing the efficiency of the switching mechanisms, it has done so at the expense of creating a more complex and less adaptable DC motor.

There exists a long-felt need in the industry for a brushless DC motor which can be easily manufactured at a low cost and which is readily adaptable to both industrial and commercial applications. There is also the need for the motor to be efficient and yield a high torque.

SUMMARY OF THE INVENTION

The present brushless DC electric motor is comprised of a disk rotor sandwich between two toroidal stators with an axial air gap separating the rotor and stators. Equally spaced around the rotor's periphery are mounted several permanent magnet field poles.

Each stator has several lamination blocks mounted to it, upon which are mounted armature coils. The armature coils are positioned so that they face the permanent magnet poles on the rotor. The stator assembly is secured to an aluminum housing.

Each stator is an independent member and as such can drive the rotor as a separate electric motor, in the single stage drive mode. The present invention is also adaptable to a two stage drive mode of operation, wherein both stators are connected in series, or parallel, in order to drive the rotor. In this two stage configuration there are twice as many active armature coils as in the single stage drive mode. Doubling the number of armature coils results in a doubling of the magnetic flux density which yields a two-fold increase in the shaft torque output.

The net result is in effect the same as if two independent motors were coupled to the same shaft in order to drive a heavy load.

As the rotor rotates, the current in each of the armature coil windings changes direction. The armature coils are connected in series to form a segment wherein each of the segments are connected in parallel through a power switch to the power supply.

The lateral design of the present invention simplifies the manufacturing and assembly process involved. This configuration also increases the accessibility of the motor components. Since there are no significant radial constraints in this design, as there are in the radially configured stator-rotor assembly, the efficiency of the motor is improved through the use of a larger sized conductor and a greater number of turns.

Moreover, the design of the present invention allows for axial stacking of two stators and one rotor or three stators and two rotors which in turn allows for greater freedom for a motor designer to double, triple or quadruple the shaft output torque within a relatively small motor frame size as compared to the size of conventional motors which produce the same amount of torque.

Accordingly, it is an object of this invention to provide a high torque lateral brushless DC electric motor which can be an alternative to present internal combustion engines used in the automotive industry.

A more particular object of this invention is to provide a lateral electric motor which can be driven by a single stator or a dual stator control combination.

Still another object of the invention is to provide a DC electrical motor whose design yields a higher than normal torque output by maximizing the total surface area on both sides of the magnetic poles at each instance of angular revolution of the rotor.

Yet another object of the invention is to provide a lateral electric DC motor which can be manufactured and assembled easily and at a low cost because of the interchangeability of it components to meet the requisite power needs.

BRIEF DESCRIPTION OF THE DRAWINGS

FIG. 4b is an enlarged view of the permanent magnets of the rotor as exposed by FIG. 4a.

FIG. 5b is a cross-section of the stator housing along line E—E of FIG. 5a.

DETAILED DESCRIPTION OF THE PREFERRED EMBODIMENT

Figure 1:
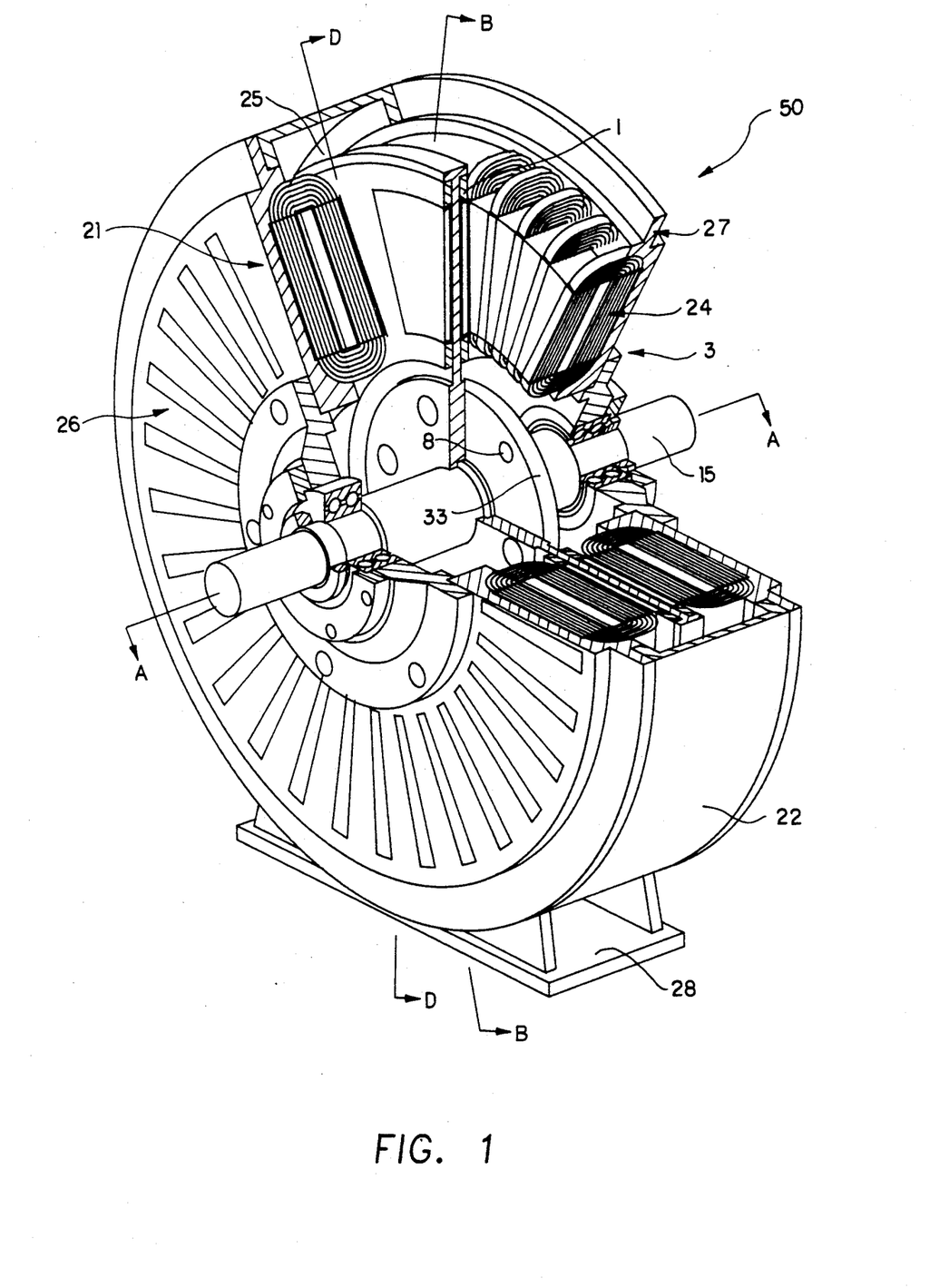
FIG. 1 is a partial cutaway isometric view of the lateral electric DC motor exposing components of a single rotor configuration.

FIG. 1 is a partial cutaway isometric view of the lateral electric DC motor 50 exposing components of a single rotor configuration. This view exposes first stator housing assembly 3, second stator housing assembly 21, and rotor 1 which is preferably a disk rotor. The first and second stator housing assemblies include first stator 27 and second stator 26 respectively, upon which are mounted lamination block-armature coil assemblies 24. The disk rotor and the first and second stator housing assembly are mounted axially along shaft 15 with air gap 25 (shown in FIG. 2) separating the disk rotor from each stator housing assembly. These shaft components are maintained within channel ring 22 which is mounted to base 28.

The shaft's rotational motion is generated by the rotational motion of disk rotor 1 which is mounted to shaft flange 33 by screws 8. Preferably six allen screws are to be used.

Figure 2:
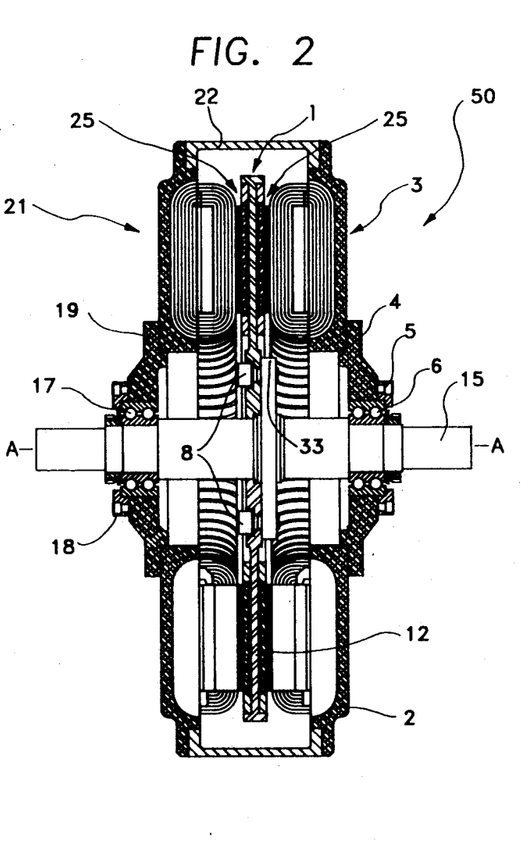
FIG. 2 is a cross sectional view of the lateral electric motor single rotor configuration taken along line A—A of FIG. 1.

FIG. 2 is a cross sectional view of the preferred embodiment, single rotor configured lateral electric motor, taken along line A—A of FIG. 1. The main components of the lateral electric motor are second stator housing assembly 21, disk rotor 1, and first stator housing assembly 3. The disk rotor is mounted and secured to shaft flange 33 by screws 8. Ball bearings 6 and 17 support shaft 15 which is further secured to the first and second stator housing assembly by lock nuts 7 and 16, bearing retainers 5 and 18, and bearing flange 4 and 19. The cross sectional view of the disk rotor reveals permanent magnet poles 12.

Figure 3:
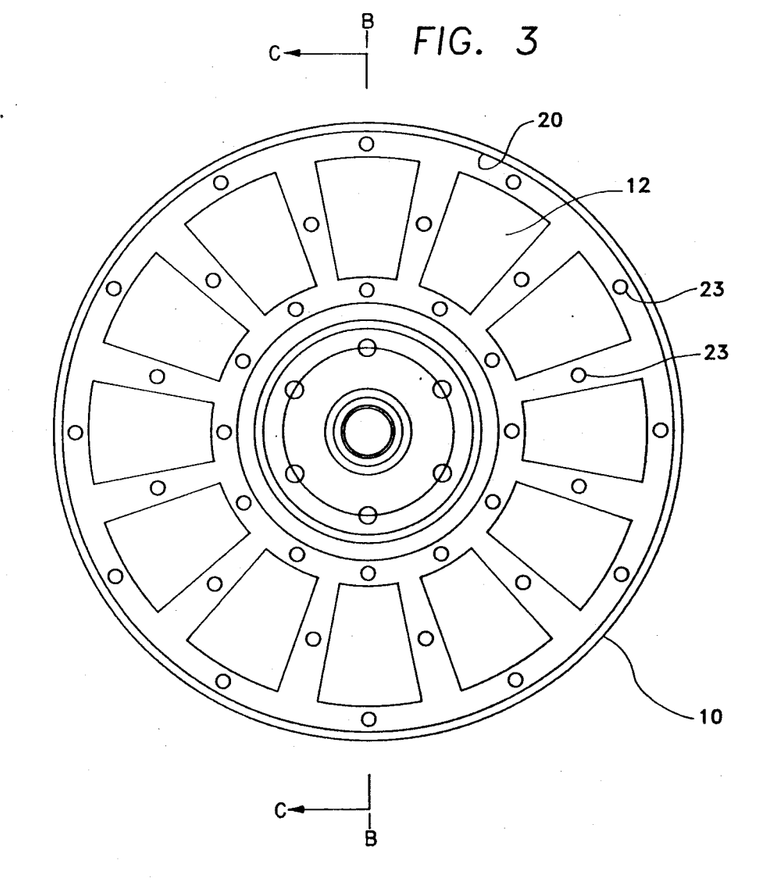
FIG. 3 is a view of the rotor taken along line B—B of FIG. 1.

FIG. 3 is a view taken along line B—B of FIG. 1, exposing the face of the rotor. In the preferred embodiment the rotor comprises a set of cage plates 20 with permanent magnet poles 12 inset in each cage plate, thus constituting the face of the rotor. The rare earth permanent magnets are inset at equidistant radial points about the periphery of the disk rotor. Moreover, the rare earth magnets are positioned such that a given rare earth magnet is of opposite polarity to either of its neighboring rare earth permanent magnet poles, thus constituting a series of magnets with alternating polarity. This positioning produces rare earth permanent magnets which are polarized perpendicular to their face. In the preferred embodiment there are twelve rare earth permanent magnets secured within polygonal shaped openings of each of the cage plates. Rivets 23 secure the cage plates together within rotor rim 10.

Figure 4A:
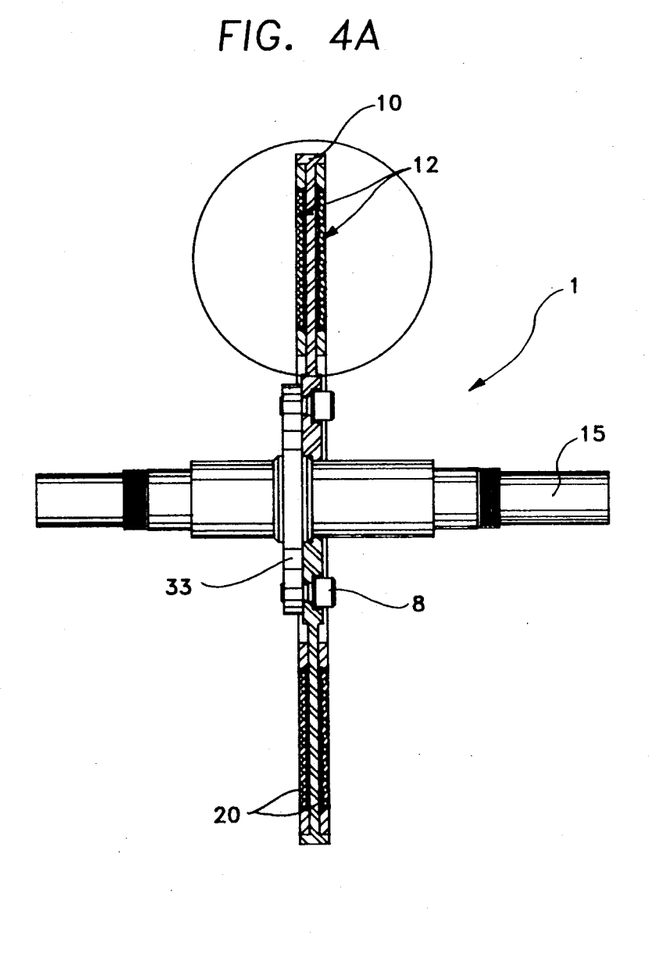
FIG. 4a is a view of the rotor taken along line C—C of FIG. 3.

FIG. 4a is a view of rotor 1 taken along line C—C of FIG. 3. This view shows the rotor mounted to shaft 15 by shaft flange 33 and screws 8.

Figure 4B:
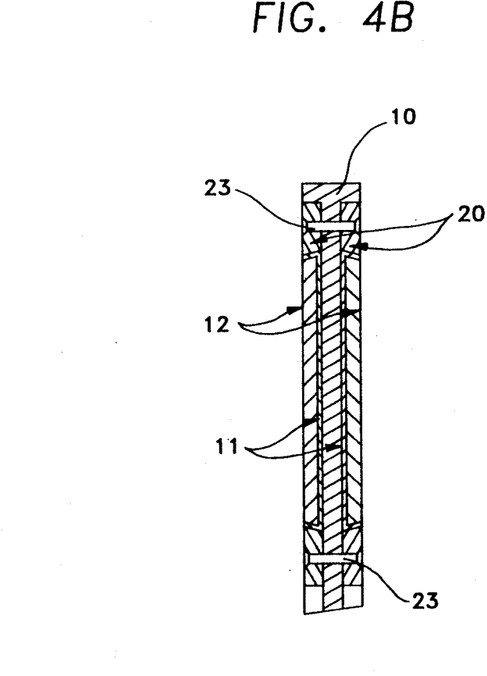

FIG. 4b is an enlarged view of permanent magnets 12 as exposed by FIG. 4a. in the preferred embodiment a ⅜ to ½ inch thick rare earth permanent magnet is partially wrapped in steel shell 11 which protects the permanent magnet from breaking or chipping during assembly and operation. Depending on the amount of horsepower needed, the permanent magnets could either be rare earth or ceramic, the former providing greater strength than the latter. Each magnet is set into on of two cage plates 20, which are preferably made of aluminum. The insets in the cage plates are tapered so as to prevent the permanent magnets from sideways motion. The cage plates are secured together and within rotor rim 10 by rivets 23. In the preferred embodiment the rotor rim is made of low carbon steel which allows the rotor to withstand higher angular velocity and centrifugal force without breaking.

Figure 5A:
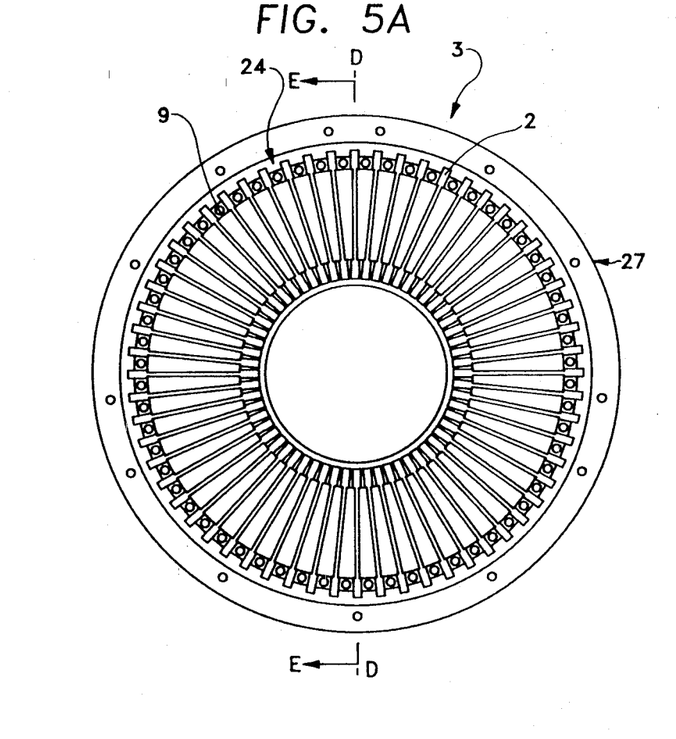
FIG. 5a is a plan view of the stator housing as exposed by the view taken along line D—D of FIG. 1.
Figure 5B:
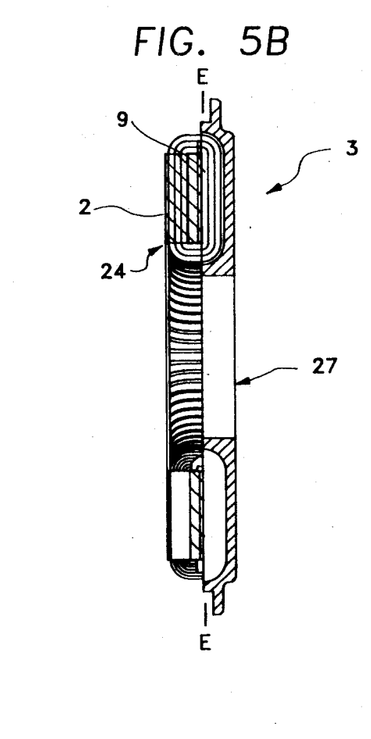

FIG. 5a is a plan view of first stator housing assembly 3 as exposed by the view taken along line D—D of FIG. 1. FIG 5b is a cross-section view of the first stator housing assembly along line E—E of FIG. 5a. The first and second stator housing assemblies (shown in FIG. 1) include first stator 27 and second stator 26 (shown in FIG. 1) and several lamination block-armature coil assemblies 24. First stator 27 and second stator 26 (shown in FIG. 1) are positioned axially along the shaft so as to sandwich the disk rotor. Mounted to the first and second stators, facing opposite the rare earth permanent magnet poles of the disk rotor (shown in FIG. 1), are lamination block-armature coil assemblies 24.

Figure 5C:
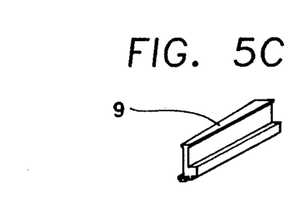
FIG. 5c is a isolated view of a lamination block.

FIG. 5c is an isolated view of lamination block 9. Lamination blocks 9 are preferably made of electric silicon steel, ANSI M-27, 5 percent silicon steel alloy in particular. Gage #29 0.014 inch thick by 4 inch wide strips of the steel are stacked to 4 inch height and cut to shape with an EDM machine. The purpose of the silicon steel is to reduce the hysteresis and eddy current losses which occur at higher frequencies within the laminating core.

Figure 5D:
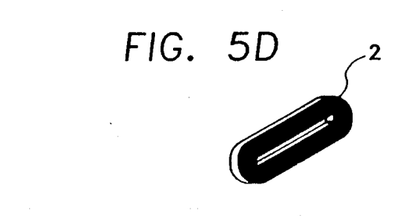
FIG. 5d is an isolated view of an armature coil.

FIG. 5d is an isolated view of armature coil 2. In the preferred embodiment the lamination block-armature coil assemblies include armature coils 2 which are wound through sixteen turns and have an average length of 9 inches per turn and mounted to lamination blocks 9. Preferably, the armature coils are wound of #10 AWG or #8 AWG flat copper magnet wire with high dielectric insulation coating.

Preferably, then, each stator has 60 armature coils wound and inserted in between 60 lamination blocks to form a toroidal core, having a length of 4.0 inches.

Since each stator assembly is comprised of multiple individual lamination blocks assembled with prewound armature coils, the entire stator core can easily be replaced with different sized lamination blocks and armature coils wound with a different number of turns and then likewise bolted to the stator.

Figure 6A:
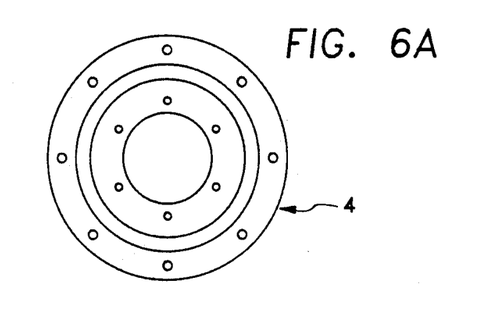
FIG. 6a is a plan view of the bearing flange.
Figures 6B, 7B, 8A, 8B:
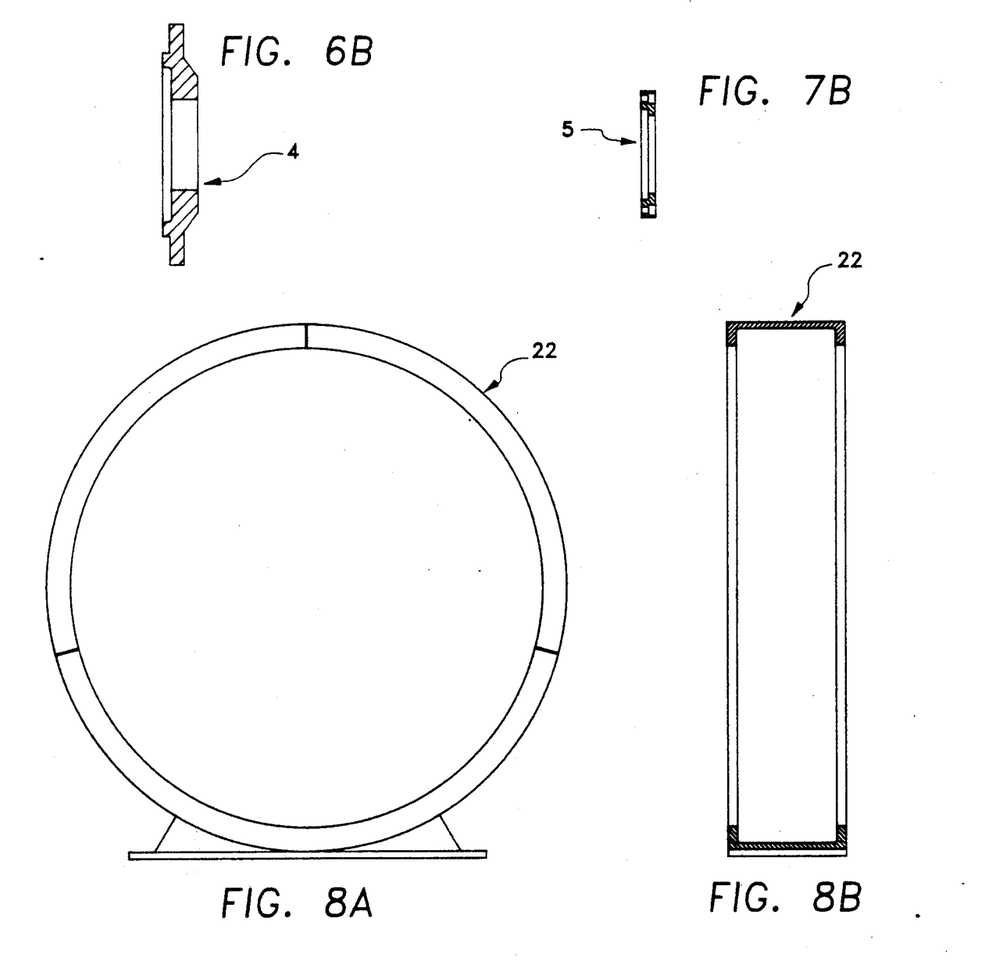
FIG. 6b is a side view of the bearing flange.
FIG. 7b is a side view of the bearing retainer.
FIG. 8a is a plan view of the ring channel.
FIG. 8b is a side view of the ring channel.
Figure 7A:
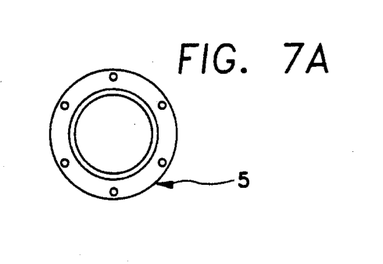
FIG. 7a is a plan view of the bearing retainer.

FIG. 6a is a plan view of bearing flange 4 and FIG. 6b is a side view of the bearing flange. FIG. 7a is a plan view of bearing retainer 5 and FIG. 7b is a side view of the bearing retainer. Bearing flange 4 and 19 (shown in FIG. 1) and bearing retainer 5 and 18 (shown in FIG. 1) secure shaft 15 to the exterior of first and second stator housing assemblies 3 and 21 (shown in FIG. 1) respectively.

FIG. 8a is a plan view of channel ring 22 and FIG. 8b is a side view of channel ring 22. The channel ring radially retains the main components while base 28 supports the entire assembly.

Figure 9A:
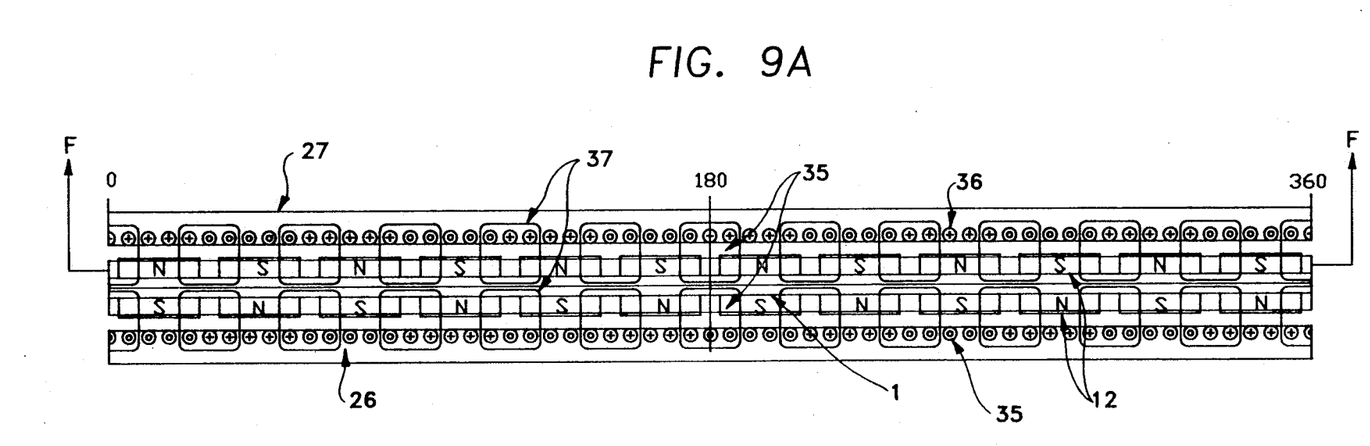
FIG. 9a is a developed view of the single rotor configuration.

FIG. 9a is a developed view of the single rotor configuration. This diagram depicts a single rotor configured lateral electric motor unwrapped into a flat strip. The single stage motor is unwrapped perpendicular to the axis of rotation into a flat strip from 0 to 360 degrees. First stator 27 and second stator 26 are depicted as the outside edges and the disc rotor 1 is depicted in the middle. Also shown are the permanent magnetic poles 12 of the disc rotor with alternating polarity. Dashed lines 37 represent the circulation of the magnetic flux through the toroidal core of each stator and the rotor. The circle within a circle symbol 35 represents the current flowing through the armature coil in the direction out of the Figure while the cross within a circle symbol 36 represent the current flow in the direction into the Figure.

Axial air gap 25 is maintained by the axial placement of the stators. The magnetic reaction between the windings and the rare earth permanent magnet poles takes place within the air gap and is represented by magnetic field 37.

Figure 9B:
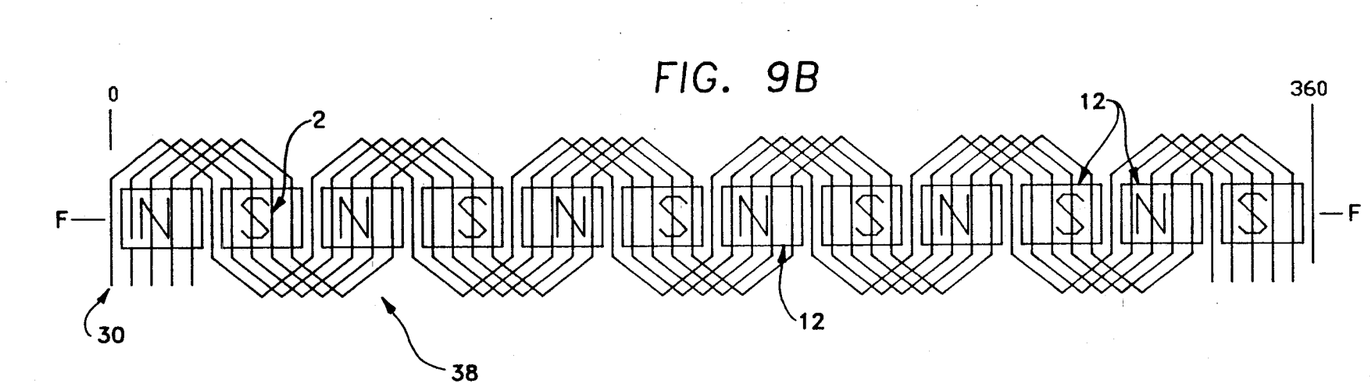
FIG. 9b is a view taken along line F—F of FIG. 9a exposing the armature coil connections and their relationship with the permanent magnet poles.
Figure 9C:
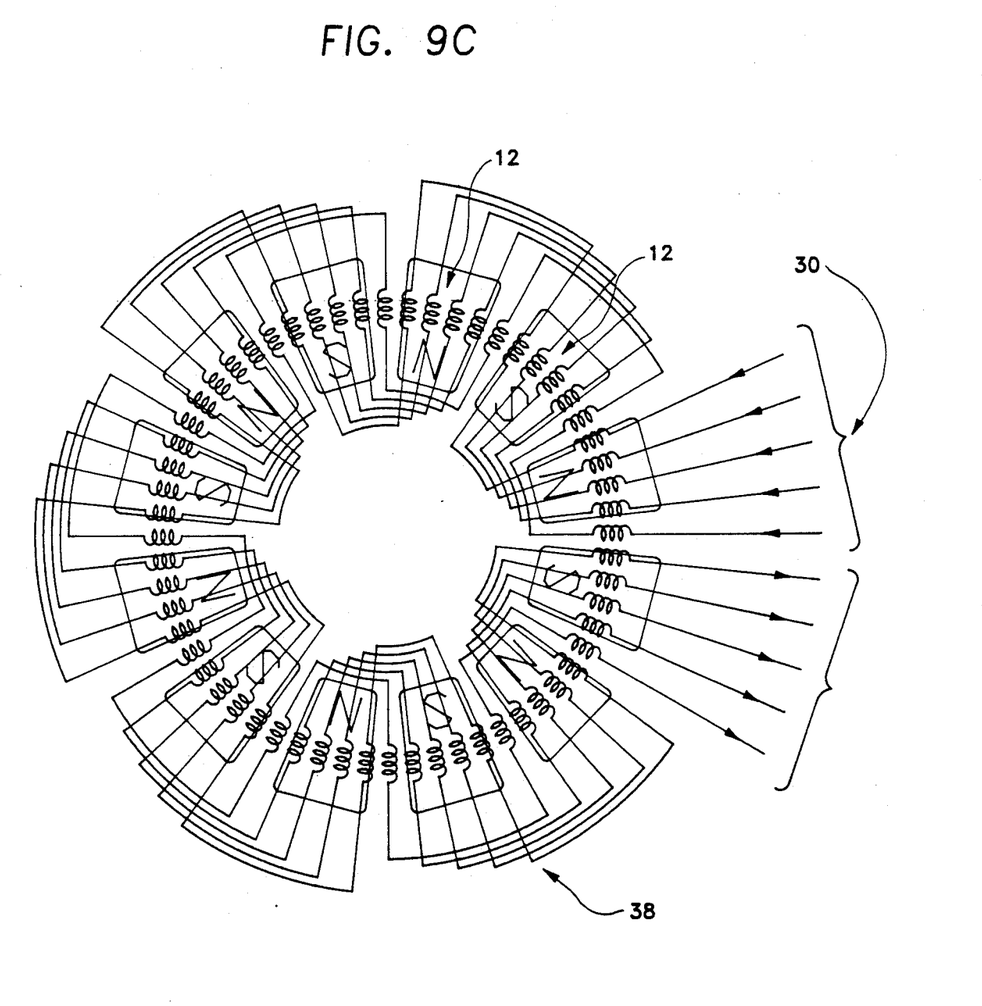
FIG. 9c is an alternative representation of a single segment and the armature coil connections and their relationship with the permanent magnet poles.

FIG. 9b is a view taken along line F—F of FIG. 9a exposing the armature coil wave series connections 38 and their relationship with the permanent magnet poles 12. FIG. 9c is an alternative representation of the armature coil wave series connections 38 and their relationship with permanent magnet poles 12. A connection of 12 armature coils connected in series forms first segment 30 which lays opposite the 12 rare earth permanent magnetic poles laterally distributed about the disk rotor (shown in FIG. 3) with alternating polarity. Thus in the preferred embodiment there are five segments of 12 armature coils each connected in series. The five segments are then connected in parallel through the switching device to the main power supply (shown in FIG. 13). At any one point in time four of the armature coil segments will be positioned over each rare earth permanent magnet pole. One armature coil segment will be positioned in between the rare earth permanent magnet poles. The armature coils are interconnected in each armature coil segment so that as an electric current is conducted through the armature coil segment it passes over the north poles of the permanent magnets in one direction and in the opposite direction over the south poles. This arrangement produces a reactive force which causes the rotor to move. The four armature coil segments which are positioned over the permanent magnet poles have current running through them, while the fifth armature coil segment is switching the direction of the current to suit the polarity of the next permanent magnet pole facing it. As a result continuous switching takes place. In order for the first and second stators to match the direction of current flow over the polarity of the permanent magnet poles of the rotor, both stators are offset 30 degrees from each other as shown in FIG. 10.

Figure 10:
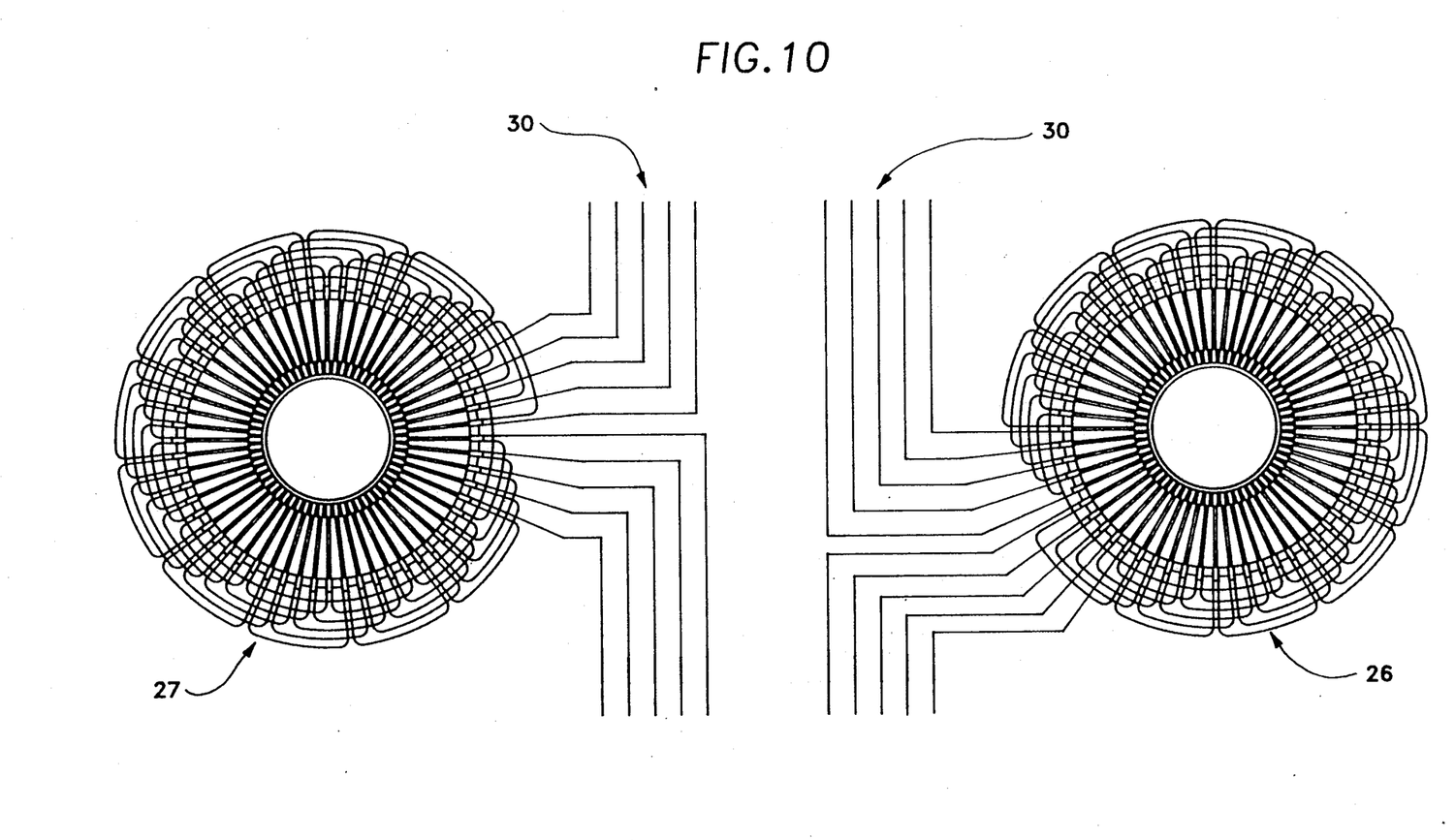
FIG. 10 is a schematic of the single stage drive connection of the first and second stators.

FIG. 10 is a schematic of the single stage drive connection. As shown, the assembly of the two stators are offset by 30 degrees to each other in order to accommodate the 30 degree difference in polarity of the permanent magnet poles. This 30 degree offset is necessary in order to align the direction of current flow in the armature coil of the first stator over the north pole of the first side of the rotor with the armature coil of the second stator over the south pole of the opposite side of the rotor disc. First segment 30 is connected to the power amplifier (shown in FIG. 13).

In the single stage drive connection each stator is separately operable and only one stator at a time can be used to drive the rotor. The single stator mode would be sufficient to drive a vehicle along a relatively flat road. In order to climb the vehicle over a hill the single motor could be switched into a dual stator series connection thus doubling the torque output.

In a dual single stage configuration, one of the stators could be used as a motor while the other could be used as a generator.

Figure 11:
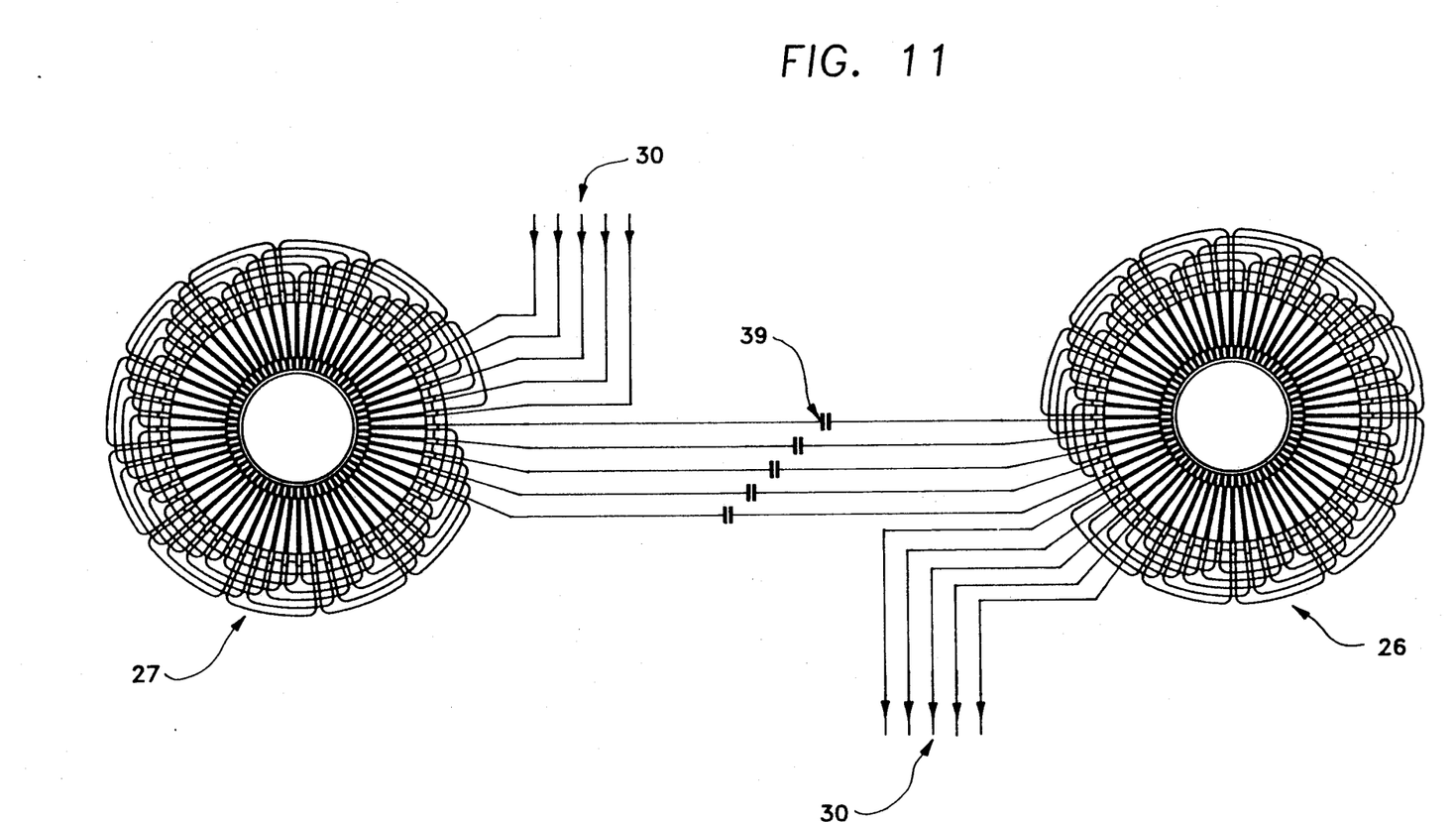
FIG. 11 is a schematic of the first and second stators connected in series in the two stage drive connection.
Figure 12:
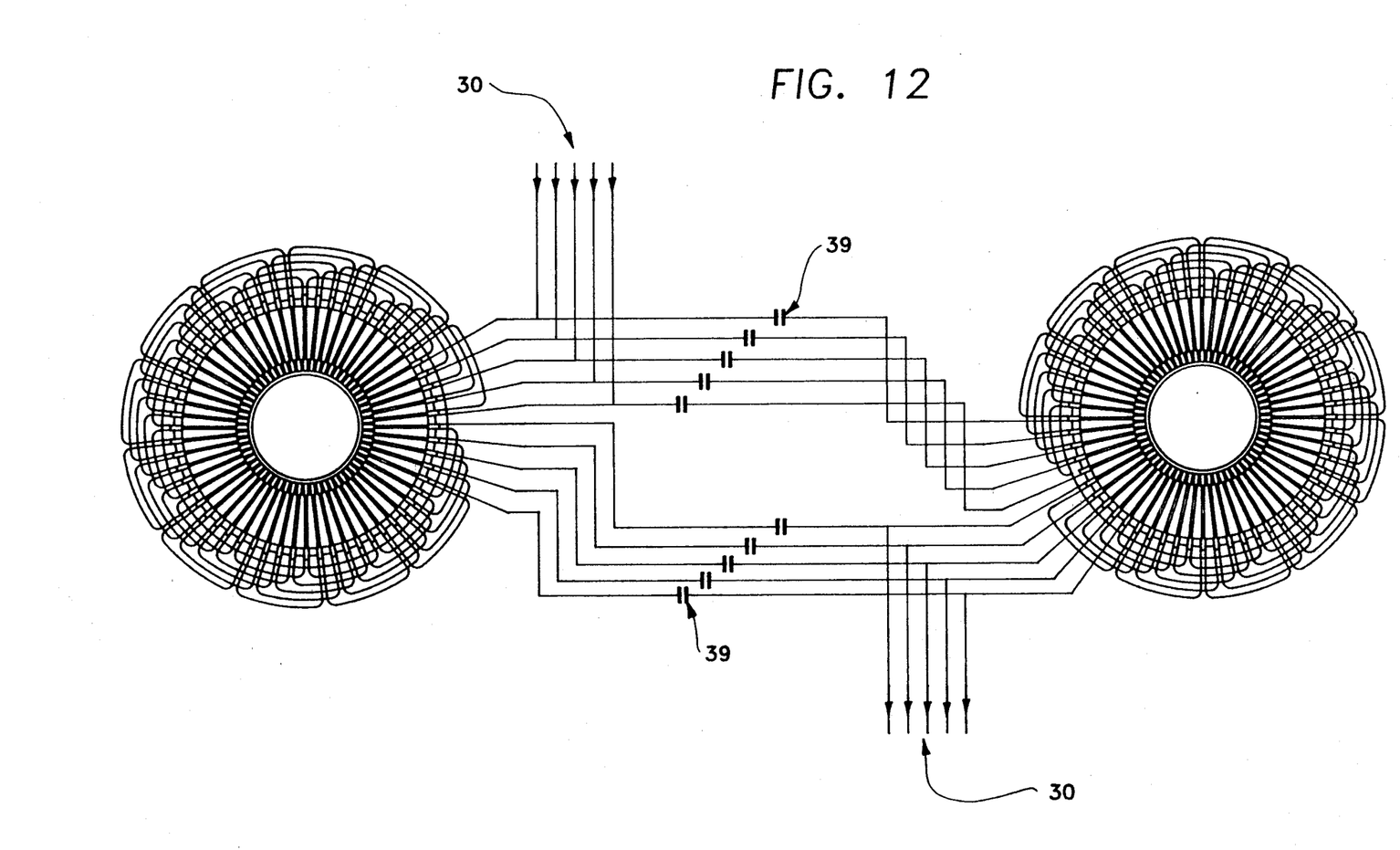
FIG. 12 is a schematic of the first and second stators connected in parallel in the two stage drive connection.

FIG. 11 is a schematic of first stator 27 and second stator 26 connected in series through solid state relays 39 in the two stage drive connection, and FIG. 12 is a schematic of first stator 27 and second stator 26 connected in parallel through solid state relays 39 in the two stage drive mode. In both the single stage and the two stage drive modes a solid state control relay is used to switch manually or automatically with an overload sensing control switching device, from single stage to two stage drive. This allows the selection of multiple torque output to occur without any mechanical gear coupling thereby maintaining the high efficiency of the motor, without overloading the conductors and wasting large amounts of energy in heat.

In the two stage drive mode the number of activated armature coils is doubled and both faces of the disk rotor are acted on. This doubling of magnetic flux density and surface doubles the torque output of the shaft.

The present invention is also adaptable to run in a three or more stage drive. Wherein any multiple of stator is connected either in series or parallel in order to provide the needed increase in torque output. In the triple stacked stator embodiment there is an arrangement of two stator housing assemblies with one double sided stator housing assembly and two rotors alternatingly sandwiched within. The double sided stator housing assembly is a stator with lamination-armature coil assemblies mounted to it and which is sandwiched between a set of disk rotors thereby generating torque through the interaction of the toroidal cores and the permanent magnet poles on both faces.

The torque of the motor is proportional to the number of conductors on the stator as well as to the amount of current per conductor and the flux per magnetic pole. In the case of a single stage drive mode there exists, preferably, a toroidal core comprised of 60 armature coils, each of which has 16 turns thereby creating 960 conductors per stator, and 60 lamination blocks. As the number of stators increases the number of conductors does so likewise and as a result the torque increases as well proportionally.

Figure 13:
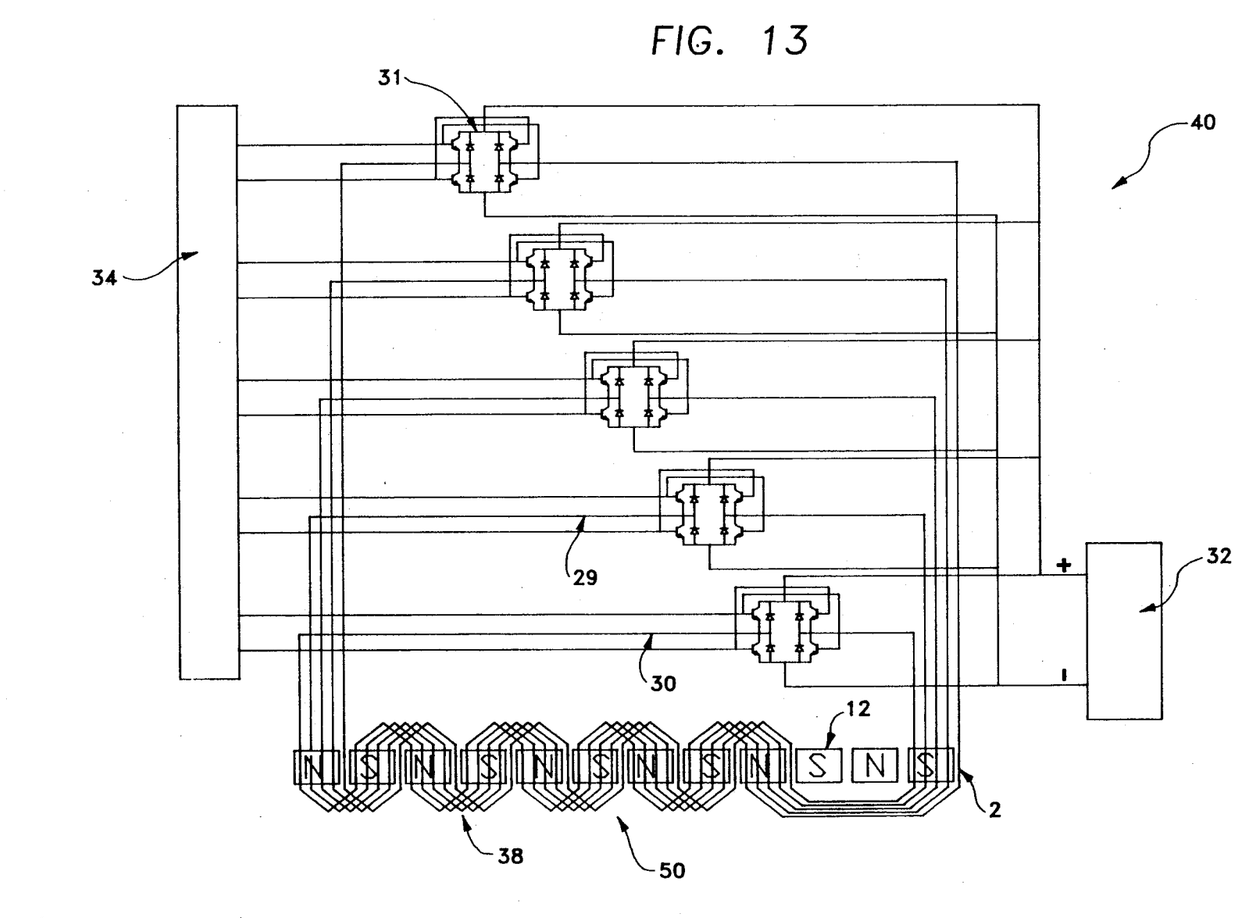
FIG. 13 is a diagram of the solid state pulse width modulation control circuit with power switches.

FIG. 13 is a diagram of pulse width modulation control circuit 40. The main elements of this system are pulse width modulated servo-controller (PWM) with amplifier 34, power supply 32, power switch 31 and lateral electric motor 50. In the preferred embodiment depicted here the stators are represented by five segments each consisting of twelve armature coils 2 connected in wave series connection 38 all of which overlay the rotor which is represented as twelve permanent magnet poles 12 positioned side by side with alternating polarity. The five segments are then connected in parallel through the power switch. Thus first segment 30 is connected in parallel to second segment 29.

In the two stage drive mode each end of each segment are connected in parallel through power switch 31 to power supply 32. In both the single stage and the two stage drive modes a solid state control relay is used to switch manually or automatically with an overload sensing control switching device, from single stage to two stage drive. This allows the selection of torque to occur without any mechanical gear coupling thereby maintaining the high efficiency of the motor, without overloading the conductors and wasting large amounts of energy in heat.

While the present invention has been described in the preferred embodiment with the permanent magnet poles mounted to the rotor and the lamination block-armature coil assemblies mounted to the first and second stator, the invention is adaptable to having the permanent magnet poles mounted to a first and second stator and the armature coils mounted to a rotor.

I claim:

1. A lateral electric motor comprising:

a shaft;

a rotor mounted to said shaft such that when said rotor rotates it exerts a force on said shaft which produces a torque;

said rotor having a plurality of permanent magnet poles;

each said permanent magnet poles being wrapped in a steel shell;

a cage plate having said permanent magnet poles inset therein;

said rotor being mounted along said shift between a first stator having a first stator housing assembly and a second stator having a second stator housing assembly;

said first and second stators include a plurality of lamination block-armature coil assemblies mounted opposite said permanent magnet poles of said rotor, wherein each lamination block-armature coil assembly includes a plurality or armature coils which are mounted to a plurality of lamination blocks; and a first segment of said armature coils comprising a plurality of armature coils connected in series wherein said first segment is connected in parallel to a second segment of said armature coils through a switching device to a power supply.

2. A lateral electric motor as recited in claim 1 wherein said first and second stator housing assemblies have aluminum housings.

3. A lateral electric motor as recited in claim 1 wherein said switching device is a power switch.

4. A lateral electric motor as recited in claim 1 wherein said lateral electric motor is driven by said first stator.

5. A lateral electric motor as recited in claim 1 wherein said lateral electric motor is driven by said first stator and said second stator connected in parallel.

6. A lateral electric motor as recited in claim 1 wherein said lateral electric motor is driven by said first stator and said second stator connected in series.

7. A lateral electric motor as recited in claim 1 further including a second rotor and a double sided stator mounted to said shaft between the two rotors.

8. A lateral electric motor as recited in claim 1 having 12 rare earth permanent magnet poles on each face of said rotor, 60 lamination block-armature coil assemblies mounted to said first stator, and 60 lamination block-armature coil assemblies mounted to said second stator.

9. A lateral electric motor as recited in claim 1 wherein said permanent magnet poles comprise rare earth magnets.

10. The lateral electric motor of claim 1 wherein said lamination block is made of electric silicon steel.

11. The lateral electric motor of claim 1 wherein said rotor comprises a set of cage plates riveted together and secured within a rotor rim and wherein each cage plate has a plurality of permanent magnets mounted with alternating polarity.

12. The lateral electric motor of claim 1 wherein said cage plate is aluminum.

13. The lateral electric motor of claim 1 wherein each of said armature coils have a flat copper magnet wire wound through sixteen turns.

* * * * *